(12) United States Patent
Suzuki

(10) Patent No.: US 6,241,300 B1
(45) Date of Patent: Jun. 5, 2001

(54) CONCEALING DOOR FOR CAR MOUNTABLE EQUIPMENT

(75) Inventor: Tomio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/426,004

(22) Filed: Oct. 25, 1999

(30) Foreign Application Priority Data

Oct. 23, 1998 (JP) .................................................. 10-319912

(51) Int. Cl.⁷ ....................................................... B60N 3/12
(52) U.S. Cl. .................... 296/37.8; 296/37.9; 296/37.12; 49/341; 49/334; 49/340; 312/322; 312/323
(58) Field of Search ............... 296/37.12, 37.9, 296/37.8, 146.4; 312/223.1, 322, 323; 49/340, 341, 339, 334

(56) References Cited

U.S. PATENT DOCUMENTS

| | | | | |
|---|---|---|---|---|
| 895,013 | * | 8/1908 | Hanington | 49/341 |
| 1,907,851 | * | 5/1933 | Mertel | 49/35 |
| 2,580,032 | * | 12/1951 | Lindelof | 49/340 |
| 2,778,632 | * | 1/1957 | Mercier | 49/340 |
| 3,356,432 | * | 12/1967 | Stroud et al. | 312/323 |
| 3,439,967 | * | 4/1969 | Taylor | 312/307 |
| 3,484,991 | * | 12/1969 | Check | 49/334 |
| 3,521,938 | * | 7/1970 | Emaus | 312/246 |
| 3,524,692 | * | 8/1970 | Preston | 312/322 |
| 3,886,425 | * | 5/1975 | Weiss | 49/340 |

FOREIGN PATENT DOCUMENTS

| | | | | |
|---|---|---|---|---|
| 3307859 | * | 9/1983 | (DE) . | |
| 3708744 | * | 4/1988 | (DE) . | |
| 4235386 | * | 4/1994 | (DE) . | |
| 82219 | * | 6/1983 | (EP) . | |
| 326697 | * | 8/1989 | (EP) . | |
| 0 338 405 | | 10/1989 | (EP) | B60K/37/01 |
| 541479 | * | 5/1993 | (EP) . | |
| 2644507 | * | 9/1990 | (FR) . | |
| 2209656 | * | 5/1989 | (GB) . | |
| 59-223529 | * | 12/1984 | (JP) . | |
| 01122742 | * | 5/1989 | (JP) . | |
| 02031954 | * | 2/1990 | (JP) . | |
| 04050036 | * | 2/1992 | (JP) . | |
| 04-260844 | | 9/1992 | (JP) | B60R/11/02 |
| 07-285390 | | 10/1995 | (JP) | B60R/11/02 |
| 09-254720 | | 9/1997 | (JP) | B60R/11/02 |
| 10-016653 | | 1/1998 | (JP) | B60R/11/02 |
| 10-119660 | | 5/1998 | (JP) | B60R/11/02 |
| 11-240389 | | 9/1999 | (JP) | B60R/11/02 |

* cited by examiner

*Primary Examiner*—D. Glenn Dayoan
*Assistant Examiner*—Kiran Patel
(74) *Attorney, Agent, or Firm*—Sughrue, Mion, Zinn, Macpeak & Seas, PLLC

(57) ABSTRACT

An opening-closing door (20) for closing an equipment body (10) is provided at a front side of a car-mounted-type equipment, and an operating portion (21) for operating the equipment body (10) can be operated only when the opening-closing door (20) is in its open condition. A pivotal movement point, serving as an axis of pivotal movement of the opening-closing door (20), as well as a drive point to which a drive force for pivotally moving the opening-closing door (20) is applied, is provided on the opening-closing door (20). A first drive mechanism (race (35)) for driving the pivotal movement point in a direction perpendicular to the front side of the door (20), disposed in its closed condition, is provided at the opening-closing door (20). A second drive mechanism (lever (36)) for pivotally moving the opening-closing door (20) about the pivotal movement point is provided at the opening-closing door. When the opening-closing door (20) is to be opened, a slide pin (38), serving as the pivotal movement axis, is driven to a predetermined position in the perpendicular direction by the rack (35) prior to of the pivotal movement of the opening-closing door (20), and thereafter the lever (36) presses the drive point, thereby pivotally moving the opening-closing door (20) about the pivotal movement point.

5 Claims, 9 Drawing Sheets

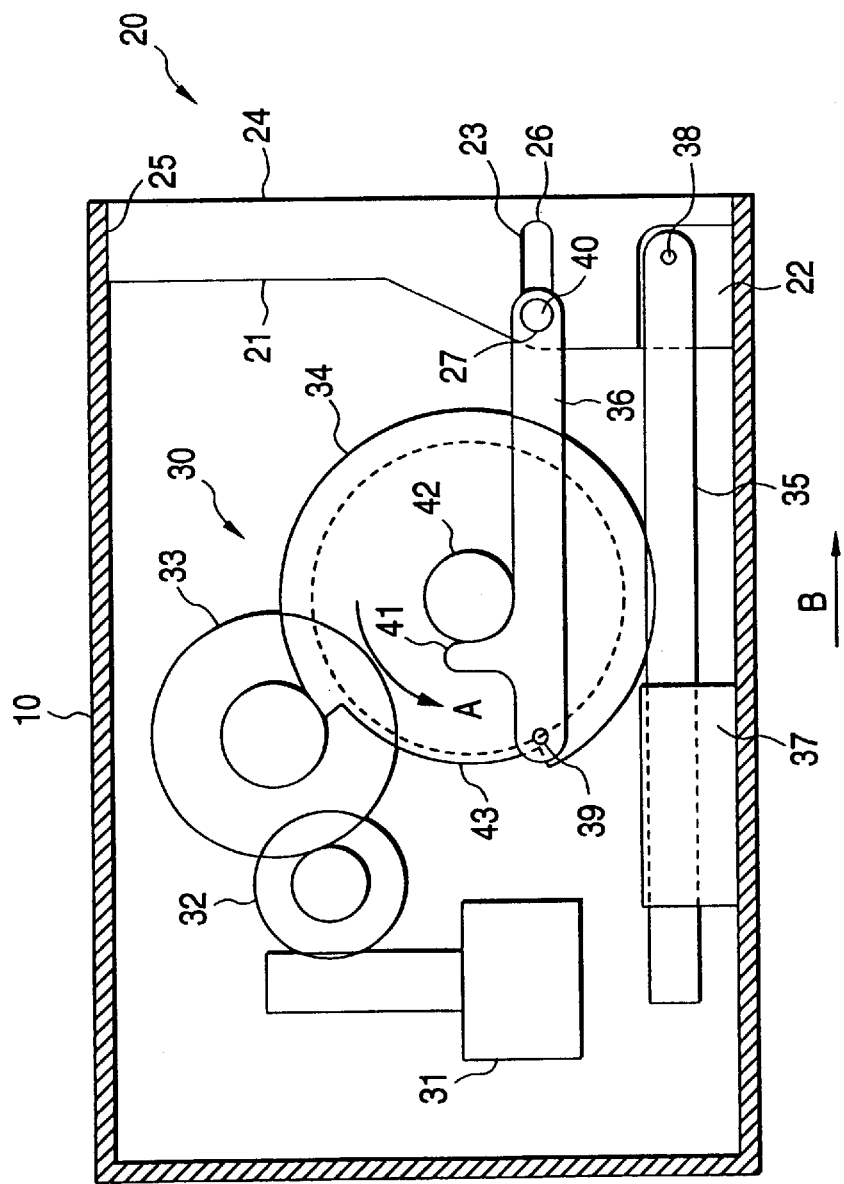
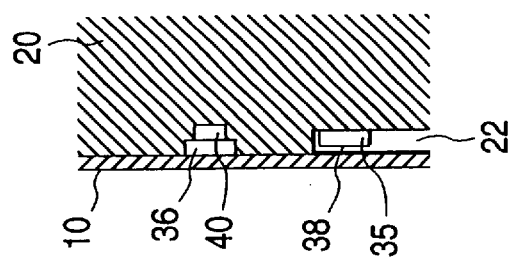

CONCEALING DOOR FOR CAR MOUNTABLE EQUIPMENT

BACKGROUND OF THE INVENTION

1. Field of the Invention

This invention relates to a structure for preventing the stealing of a car-mounted-type equipment, and more particularly to a specific construction in which an operating portion of the equipment and an equipment body are effectively closed by an openable opening-closing door so as to prevent the stealing of the equipment.

2. Description of the Related Art

Various constructions have heretofore been proposed for preventing the stealing of a car-mounted-type equipment.

For example, if an operating portion of an equipment is of the detachable type, it can be detached therefrom, and can be taken out from a car when the driver leaves the car. Without the operating portion, the equipment is unable to be operated, and therefore the stealing of the equipment can be prevented. For the same reason, if a lid is provided on an operating portion of an equipment, and the surface of the lid has the same design as that of a dashboard, then the stealing of the equipment can be prevented since at a glance, it seems that no equipment is mounted on the car.

It has been proposed to provide a construction in which an operating portion 2 of an equipment is rotatable through an angle of 180 degrees.

FIGS. 9A to 9D are schematic views showing the manner of rotating the operating portion 2 mounted at the front side of a box-like body 1. FIG. 9A shows a condition of use of the equipment in which an operating surface of the operating portion 2 is disposed at the front side of the box-like body 1. For example, when the operator operates a key, the operating portion 2 is rotated in such a manner that a top portion of the operating portion 2 is moved downward along slide grooves (not shown), formed in inner side surfaces of the box-like body 1, while a bottom portion of the operation portion 3 is moved forwardly of the front side of the box-like body 1, as shown in FIG. 9B. When the operating portion 2 is further rotated (see FIG. 9C), a disk insertion slot 3 appears inwardly of the operating portion 2, so that a disk can be inserted into this slot. When the operating portion 2 is further rotated, so that the front side of the box-like body 1 is covered with a reverse surface of the operating portion 2 (see FIG. 9D), the equipment is concealed, thereby preventing the stealing of the equipment.

However, in the case of the equipment in which the operating portion is detachable, it is necessary to secure a place for storing the operating portion, and there is also a fear that the operating portion could be lost. In the case of the construction in which the lid is provided at the operating portion, the lid projects from the box-like body of the equipment by an amount corresponding to the thickness of this lid, and therefore when the equipment is received in a receiving space within the car, the lid projects from this receiving space by an amount corresponding to the thickness of the lid, and thus the existence of the equipment can be recognized from the appearance, which raises the chance that the equipment may be stolen. In the case of the construction in which the operating portion is rotated through an angle of 180 degrees to be concealed, there has been encountered a problem that the structure is complicated, and the efficiency of space utilization is low.

However, in the case of the equipment in which the operating portion is detachable, it is necessary to secure a place for storing the operating portion, and besides there is a fear that the operating portion is lost. In the case of the construction in which the lid is provided at the operating portion, the lid projects from the box-like body of the equipment by an amount corresponding to the thickness of this lid, and therefore when the equipment is received in a receiving space within the car, the lid projects from this receiving space by an amount corresponding to the thickness of the lid, and the existence of the equipment can be recognized from the appearance, thus inviting a problem that the equipment may be stolen. In the case of the construction in which the operating portion is rotated through an angle of 180 degrees to be concealed, there has been encountered a problem that the structure is complicated, and the efficiency of space utilization is low.

SUMMARY OF THE INVENTION

This invention has been made in view of the above problems, and an object of the invention is to provide a specific construction in which an operating portion of an equipment and an equipment body are effectively closed by an openable opening-closing door so as to prevent the stealing of the equipment.

According to the present invention, there is provided an equipment for mounting on a car comprising:

an opening-closing door mounted at a front side of the car-mounted-type equipment so as to close the equipment;

an operating portion for operating the equipment, the operating portion being provided on such a surface that the operating portion can be operated only when the opening-closing door is in its open condition;

a pivotal movement point, serving as an axis of pivotal movement of the opening-closing door, and a drive point to which a drive force for pivotally moving the opening-closing door is applied, the pivotal movement point and the drive point being provided on the opening-closing door;

a first drive mechanism for driving the pivotal movement point in a direction perpendicular to a front side of the door disposed in its closed condition; and a second drive mechanism for pivotally moving the opening-closing door about the pivotal movement point;

wherein when the opening-closing door is to be opened, the axis of pivotal movement is driven in the perpendicular direction by the first drive mechanism before the opening-closing door is pivotally moved.

In the car-mounted-type equipment of the present invention, the opening-closing door for closing the equipment is provided at the front side of the car-mounted-type equipment, and the operating portion for operating the equipment can be operated only when the opening-closing door is in its open condition. The pivotal movement point, serving as the axis of pivotal movement of the opening-closing door, as well as the drive point to which a drive force for pivotally moving the opening-closing door is applied, is provided on the opening-closing door. The first drive mechanism for driving the pivotal movement point in a direction perpendicular to the front side of the door, disposed in its closed condition, is provided at the opening-closing door. The second drive mechanism for pivotally moving the opening-closing door about the pivotal movement point is provided at the opening-closing door. When the opening-closing door is to be opened, the pivotal movement axis is driven to a predetermined position in the perpendicular direction by the first drive mechanism prior of the pivotal movement of the opening-closing door, and thereafter the second drive mechanism presses the drive point, thereby pivotally moving the opening-closing door about the pivotal movement point.

BRIEF DESCRIPTION OF THE DRAWINGS

FIGS. 1A and 1B are views of a first embodiment of a car-mounted-type equipment of the present invention, showing a condition in which an equipment body is closed by an opening-closing door.

DETAILED DESCRIPTION OF THE PREFERRED EMBODIMENTS

Figure 2:
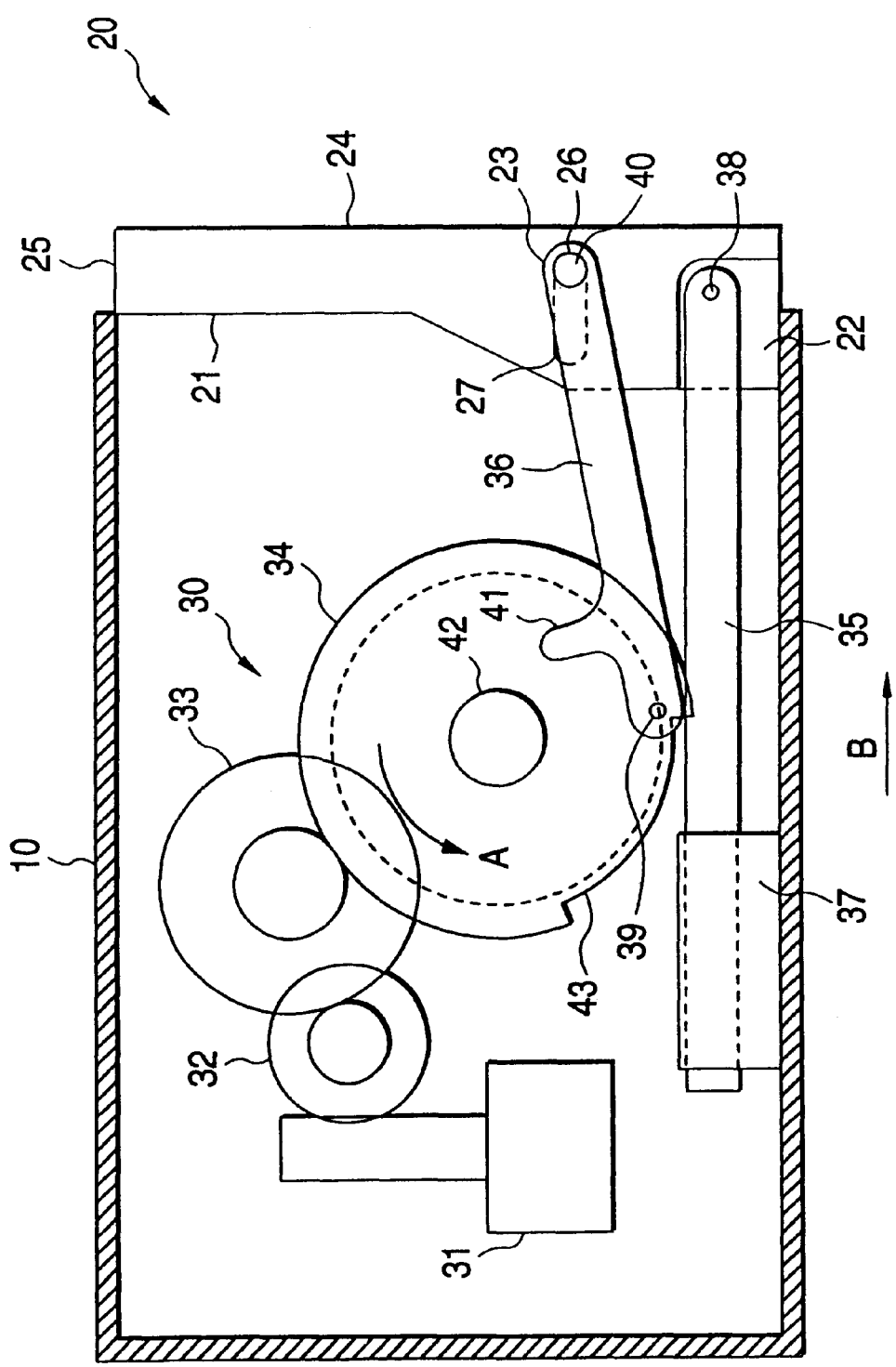
FIG. 2 is a view of the first embodiment of the car-mounted-type equipment of the present invention, showing a condition in which the opening-closing door is moved to a pivotal movement position.

FIGS. 1A and 1B are views showing a first embodiment of a car-mounted-type equipment of the present invention, and the construction of this car-mounted-type equipment will be described with reference to FIGS. 1A and 1B.

In the car-mounted-type equipment shown in FIGS. 1A and 1B, an opening-closing door 20 is disposed in a condition (closed condition) in which this door 20 is pivotally moved substantially 90 degrees relative to an equipment body 10, and the front side of the equipment body 10 is closed by a bottom 24 of the opening-closing door 20. In this Figure, a front side surface 25 (an upper end) in the opening-closing door 20 is held in contact with a top plate of the equipment body 10. The bottom 24 of the opening-closing door 20 has the same design as that of a dashboard within the car, and an opening-closing button (not shown) is provided at a portion of the bottom 24, and is disposed in a plane, in which the bottom 24 lies, so that this button can not be recognized from the exterior.

FIG. 1A shows the overall construction of the car-mounted-type equipment, and FIG. 1B shows a left-hand portion of the car-mounted-type equipment as seen from the front side thereof, and shows the positional relationship of the opening-closing door 20, a rack 35 and a lever 36.

This car-mounted-type equipment comprises the opening-closing door 20 for closing the equipment body 10 in such a manner that an operating portion 21 of the opening-closing door 20 faces the interior of the equipment body 10, and a drive portion 30 for opening and closing the opening-closing door 20. The drive portion 30 comprises a motor 31, a small gear 32 for reducing the rotational speed of the motor 31, a transmission gear 33 for transmitting the rotation of the small gear 32 to a gear 34, the rack 35 for converting the rotational movement of the gear 34 into a linear movement so as to drive the opening-closing door 20, and the lever 36 for pivotally moving the opening-closing door 20, the lever 36 having a lock mechanism.

The rack 35, serving as a first drive mechanism, is slidably supported on the equipment body 10 by a support portion 37, and the gear 34 is in mesh with the rack 35, and with this construction, the rotation (in a counterclockwise direction indicated by arrow A) of the gear 34 is transmitted to the rack 35, so that the rack 35 is slid in a right-hand direction (indicated by arrow B in the drawings). One end of the rack 35 is pivotally connected by a slide pin 38 to a recessed portion 22 formed in one side surface of the opening-closing door 20.

On the other hand, one end of the lever 36, serving as a second drive mechanism, is pivotally connected by a drive pin 39 to an outer peripheral portion of the gear 34, and a roller 40 is rotatably mounted on the other end of the lever 36. The roller 40 is rotatably held between a pivotal-movement groove 23 of a generally elliptical shape, formed in the side surface of the opening-closing door 20, and the side surface of the equipment body 10.

That portion of the pivotal-movement groove 23 closest to the bottom 24 of the opening-closing door 20 will hereinafter be referred to as "an opening-axis portion 26", and that portion of this groove 23 remotest from the bottom 24 will hereinafter be referred to as "a closing-axis portion 27", and the roller 40 is engageable with these portions 26 and 27.

A projected portion 41, having the lock mechanism, is formed on the lever 36. When the opening-closing door 20 is in its closed condition, the projected portion 41 of the lever 36 is engaged with a shaft 42 of the gear 34, and the roller 40, rotatably mounted on the lever 36, is engaged with the closing-axis portion 27 of the pivotal-movement groove 23, and therefore the opening-closing door 20 will not be opened forwardly away from the front side of the equipment body 10.

The gear 34 of the drive portion 30 has a non-toothed portion 43 (having no tooth) at a predetermined portion thereof. The gear 34 rotates, and when the non-toothed portion 43 is brought into facing relation to the teeth of the rack 35, the rack 35 is not driven even when the gear 34 is further rotated.

The foregoing is the description of the construction of the car-mounted-type equipment according to the first embodiment of the present invention.

Next, the operation of the car-mounted-type equipment will be described in detail with reference to FIGS. 1 to 5.

FIGS. 1A and 1B show the closed condition in which the opening-closing door 20 closes the front side of the equipment body 10, and this is the initial condition of the operation. The operation for opening the opening-closing door 20 will now be described.

(1) First, when the operator depresses the opening-closing button provided at the bottom 24 of the opening-closing door 20, a CPU (not shown), provided within the equipment body 10, detects the depression of the opening-closing button, and sends a control signal to the motor 31 so as to rotate the same. When the motor 31 rotates, the rotational speed of the motor 31 is reduced by the small gear 32 and the transmission gear 33, and the gear 34 is rotated in the counterclockwise direction (indicated by arrow A).

(2) When the gear 34 rotates, the lever 36, pivotally connected by the pin 39 to the outer peripheral portion of the gear 34, moves in the direction of arrow A in accordance with the rotation of the gear 34, and the projected portion 41, formed on the lever 36, is disengaged from the shaft 42, and the lever 36 moves in a direction of arrow B, so that the roller 40, rotatably mounted on the lever 36, moves along the pivotal-movement groove 23 from the closing-axis portion 27 toward the opening-axis portion 26. Therefore, a force to move the opening-closing door 20 forwardly away from the front side of the equipment body 10 is not applied from the lever 36 to the opening-closing door 20. Since the gear 34 is in mesh with the rack 35, the rotation of the gear 34 is transmitted to the rack 35, so that the rack 35 is moved in the direction of arrow B (that is, in a direction perpendicular to the front side of the equipment body 10). Since the one end of the rack 35 is pivotally connected by the slide pin 38 to the side surface of the opening-closing door 20, the opening-closing door 20 is moved forwardly away from the front side of the equipment body 10 in accordance with the movement of the rack 35. Namely, when the opening-closing door 20 is to be pivotally moved or opened, the slide pin 38, serving as the axis of pivotal movement of the opening-closing door 20, is driven or moved by the rack 35 in the direction perpendicular to the front side of the equipment body 10 before the opening-closing door 20 is pivotally moved.

FIG. 2 shows a condition in which the opening-closing door 20 is moved by the above operation into a position (hereinafter referred to as "pivotal movement position") where the front side surface 25 of the opening-closing door 20 is disposed out of engagement with the top plate of the equipment body 10.

In this pivotal movement position, the roller 40, rotatably mounted on the lever 36, is engaged with the opening-axis portion 26 of the pivotal-movement groove 23, and also the non-toothed portion 43 of the gear 34 reaches the teeth of the rack 35.

The non-toothed portion 43 of the gear 34 will not meshingly engage the rack 35, and therefore the rack 35 will not move even when the gear 34 further rotates.

Figure 3:
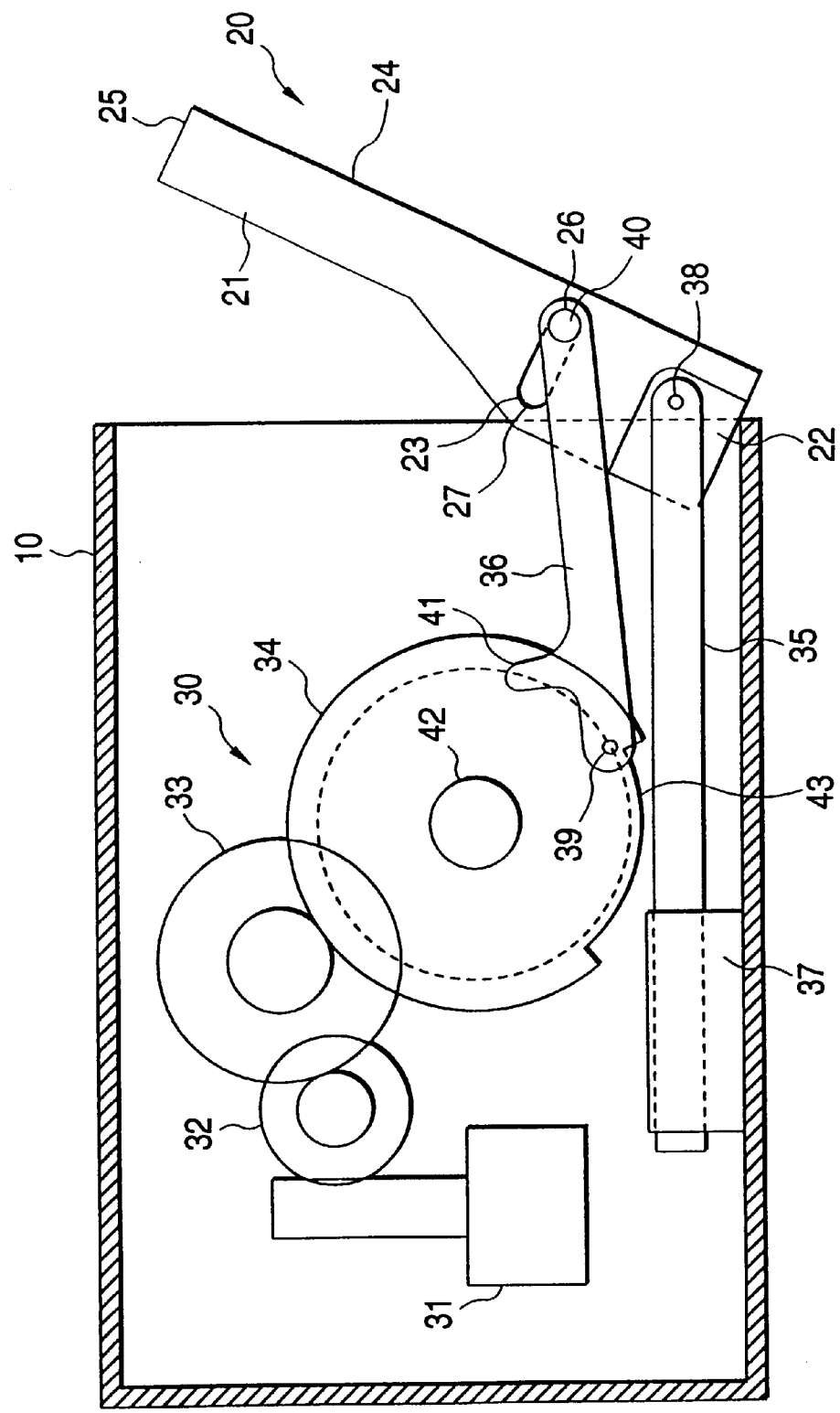
FIG. 3 is a view of the first embodiment of the car-mounted-type equipment of the present invention, showing the manner of pivotal movement of the opening-closing door.

(3) Then, when the gear 34 further rotates, the roller 40, rotatably mounted on the lever 36, presses the opening-axis portion 26 of the pivotal-movement groove 23, so that the opening-closing door 20 is pivotally moved about the slide pin 38 as shown in FIG. 3.

Figure 4:
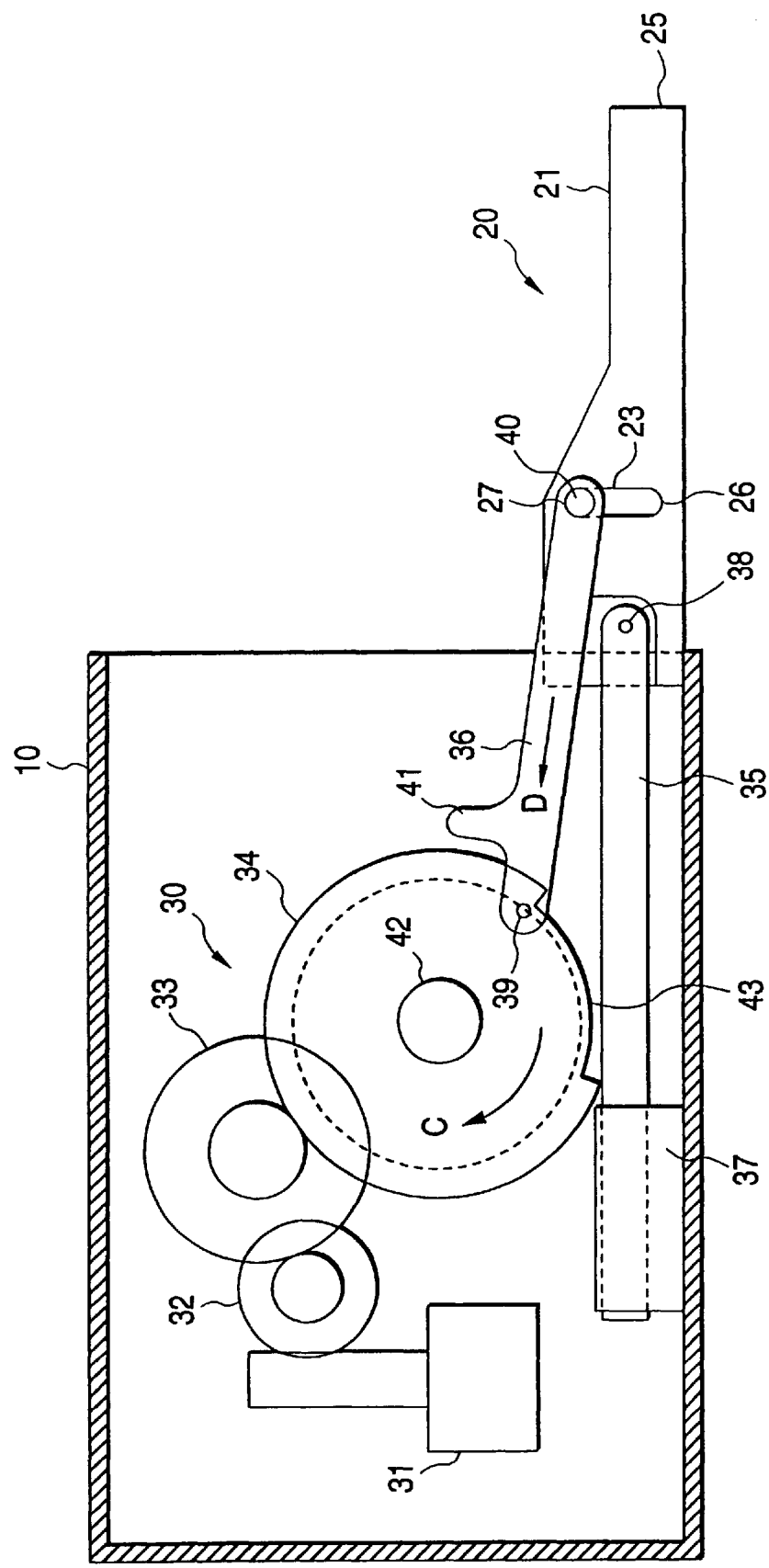
FIG. 4 is a view of the first embodiment of the car-mounted-type equipment of the present invention, showing a condition in which the opening-closing door is pivotally moved through an angle of 90 degrees.
Figure 5:
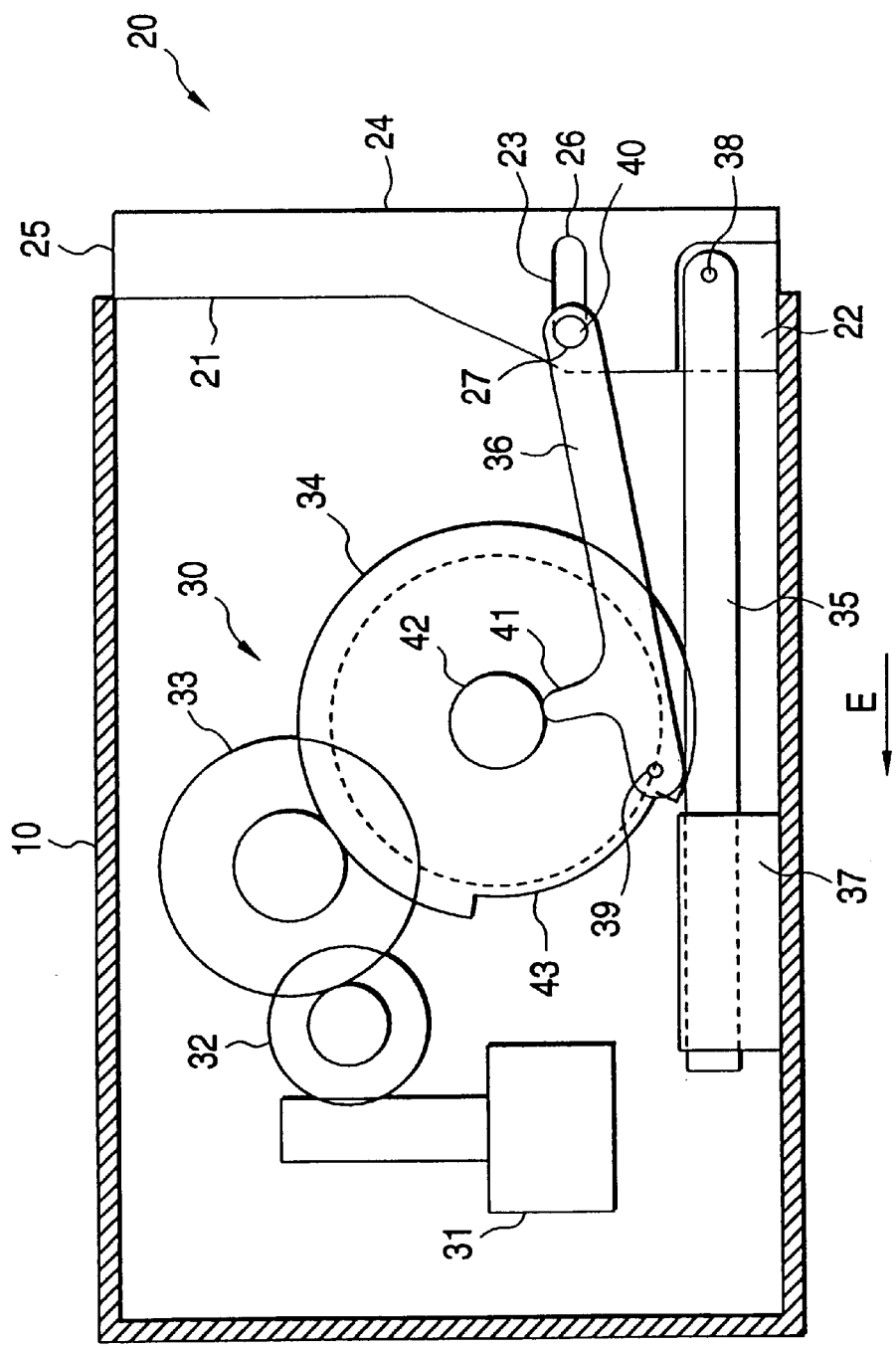
FIG. 5 is a view of the first embodiment of the car-mounted-type equipment of the present invention, showing a condition in which the opening-closing door is returned to the pivotal movement position.

When the gear 34 further rotates, the opening-closing door 20 is pivotally moved substantially 90 degrees into an open condition in which the front side of the equipment body 10 is completely open, as shown in FIG. 4. During the time when the opening-closing door 20 is thus pivotally moved substantially 90 degrees, the roller 40 on the lever 36 is moved from the opening-axis portion 26 of the pivotal-movement groove 23 to the closing-axis portion 27.

When the CPU detects the opening of the opening-closing door 20 into a predetermined position, the CPU stops the rotation of the motor 31.

During the time when the opening-closing door 20 is pivotally moved substantially 90 degrees from the pivotal movement position, the non-toothed portion 43 of the gear 34 faces the rack 35, so that the rotation of the gear 34 is not transmitted to the rack 35.

As shown in FIG. 4, the opening-closing door 20 is arranged, with the operating portion 21 facing upwardly, and therefore the operator can operate this operating portion only when the opening-closing door 20 is located in its open condition And besides, the front side of the equipment body 10 can be made open, and therefore, for example, an insertion slot (not shown) for receiving a CD or a MD, as well as a display device (not shown), can be provided within the equipment body 10.

Next, the operation for closing the opening-closing door 20 will be described.

(4) When the operator depresses an opening-closing button (not shown) provided on the operating portion 21, the CPU rotates the motor 31 in a reverse direction. When the motor 31 thus rotates, the gear 34 begins to rotate in a direction of arrow C (i.e., clockwise direction). The lever 36 moves in a direction of arrow D in accordance with the rotation of the gear 34. The closing-axis portion 27 of the pivotal-movement groove 23 is pulled by the roller 40 on the lever 36, so that the opening-closing door 20 is pivotally moved about the slide pin 38 to be returned to the pivotal movement position shown in FIG. 5. At this time, the non-toothed portion 43 of the gear 34 passes the rack 35, so that the gear 34 is brought into meshing engagement with the rack 35.

The rotation of the gear 34 is transmitted to the rack 35, and therefore the rack 35 is moved by the rotation of the gear 34. The amount of movement of the rack 35 is larger than or equal to the amount of movement of the roller 40, and therefore the opening-closing door 20 is moved in a direction of arrow E in accordance with the movement of the rack 35.

The lever 36, pivotally connected to the gear 34, moves in the direction of arrow E in accordance with the rotation of the gear 34, so that the projected portion 41 of the lever 36 is moved in sliding contact with the shaft 42 of the gear 34, and is returned to its initial position shown in FIGS. 1A and 1B.

When the CPU detects the fact that the opening-closing door 20 is brought into the closed position, the CPU stops the rotation of the motor 31, and the sequential closing operation is finished.

Next, a second embodiment of a car-mounted-type equipment of the present invention will be described with reference to FIGS. 6 to 8. The car-mounted-type equipment of the second embodiment differs from the car-mounted-type equipment of the first embodiment in that a function, corresponding to the pivotal-movement groove 23 in the opening-closing door 20 in the car-mounted-type equipment of the first embodiment, is provided at a lever 50 in the car-mounted-type equipment of the second embodiment. In this connection, a spring 55 is mounted on the lever 50.

First, the construction of the car-mounted-type equipment of the second embodiment will be described, but description of those portions similar to those of the car-mounted-type equipment of the first embodiment will be omitted.

Figure 6:
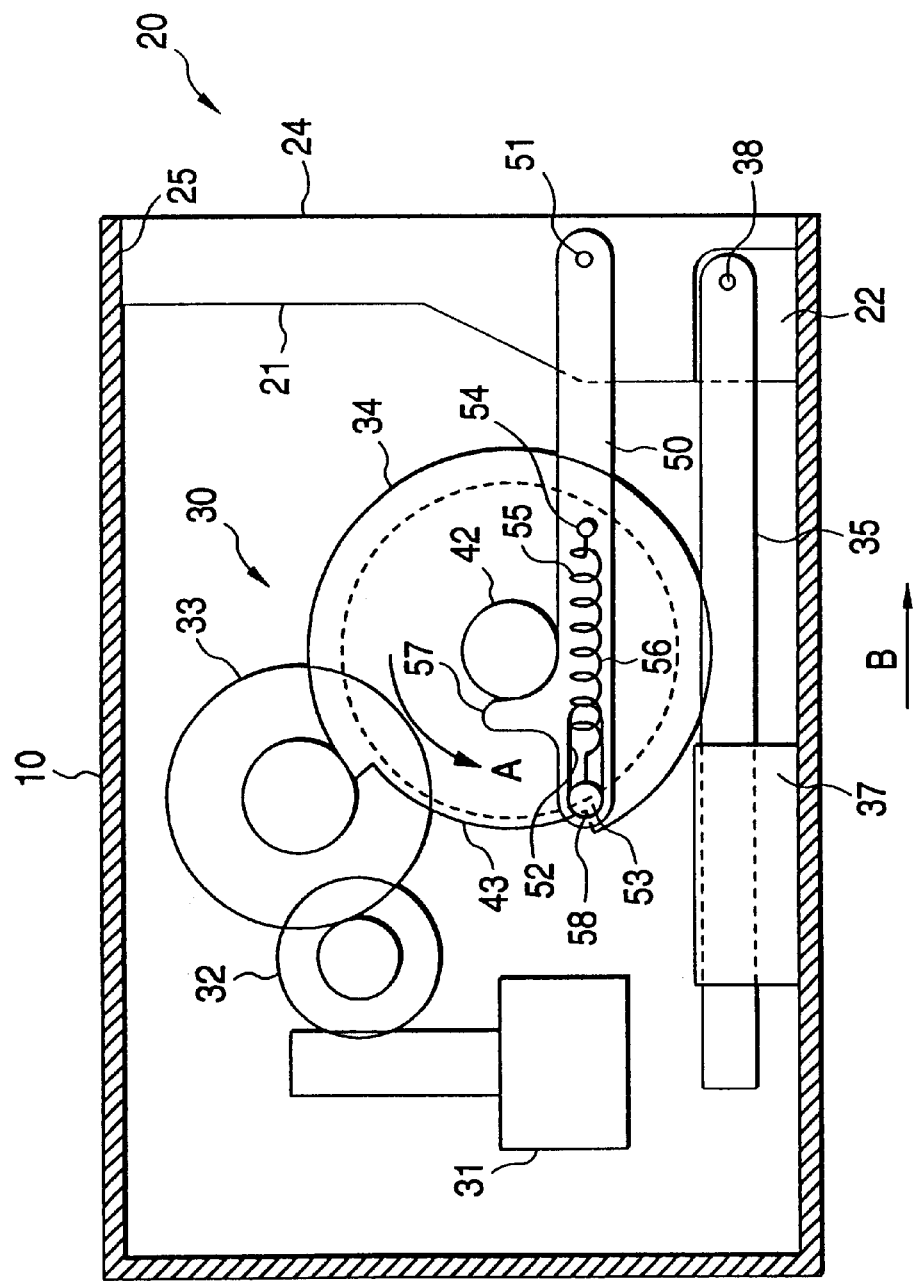
FIG. 6 is a view of a second embodiment of a car-mounted-type equipment of the present invention, showing a condition in which an equipment body is closed by an opening-closing door.

In FIG. 6, one end of the lever 50 is pivotally connected by a pivot pin 51 to a side surface of an opening-closing door 20. A pivotal-movement groove 52 is formed through the other end portion of the lever 50, and a roller 53, rotatably mounted on an outer peripheral portion of a gear 34, is slidably fitted in this pivotal-movement groove 52.

As in the first embodiment, that portion of the pivotal-movement groove 52 closest to the opening-closing door 20 will hereinafter be referred to as "an opening-axis portion 56", and that portion of this groove 52 remotest from the opening-closing door 20 will hereinafter be referred to as "a closing-axis portion 58".

A retaining portion 54 is formed on a generally-central portion of the lever 50, and the spring 55, comprising a resilient member, extends between the retaining portion 54 and the roller 53.

This embodiment is different in the above portions from the car-mounted-type equipment of the first embodiment. The spring 55, mounted on the lever 50, is required for pulling up the opening-closing door 20 in accordance with the rotation of the gear 34 so as to close the opening-closing door 20.

The operation for opening the opening-closing door 20 will be briefly described.

First, when the gear 34 rotates in a counterclockwise direction (indicated by arrow A), the roller 53, rotatably mounted on the gear 34, moves in accordance with the rotation of the gear 34, and a projected portion 57 of the lever 50 is brought out of engagement with a shaft 42 of the gear 34, thereby disengaging a lock mechanism. Since the roller 53 can slidably move along the pivotal-movement groove 52 in the lever 50, a force to move the opening-closing door 20 forwardly away from a front side of an equipment body 10 is not applied from the lever 50 to the opening-closing door 20.

Figure 7:
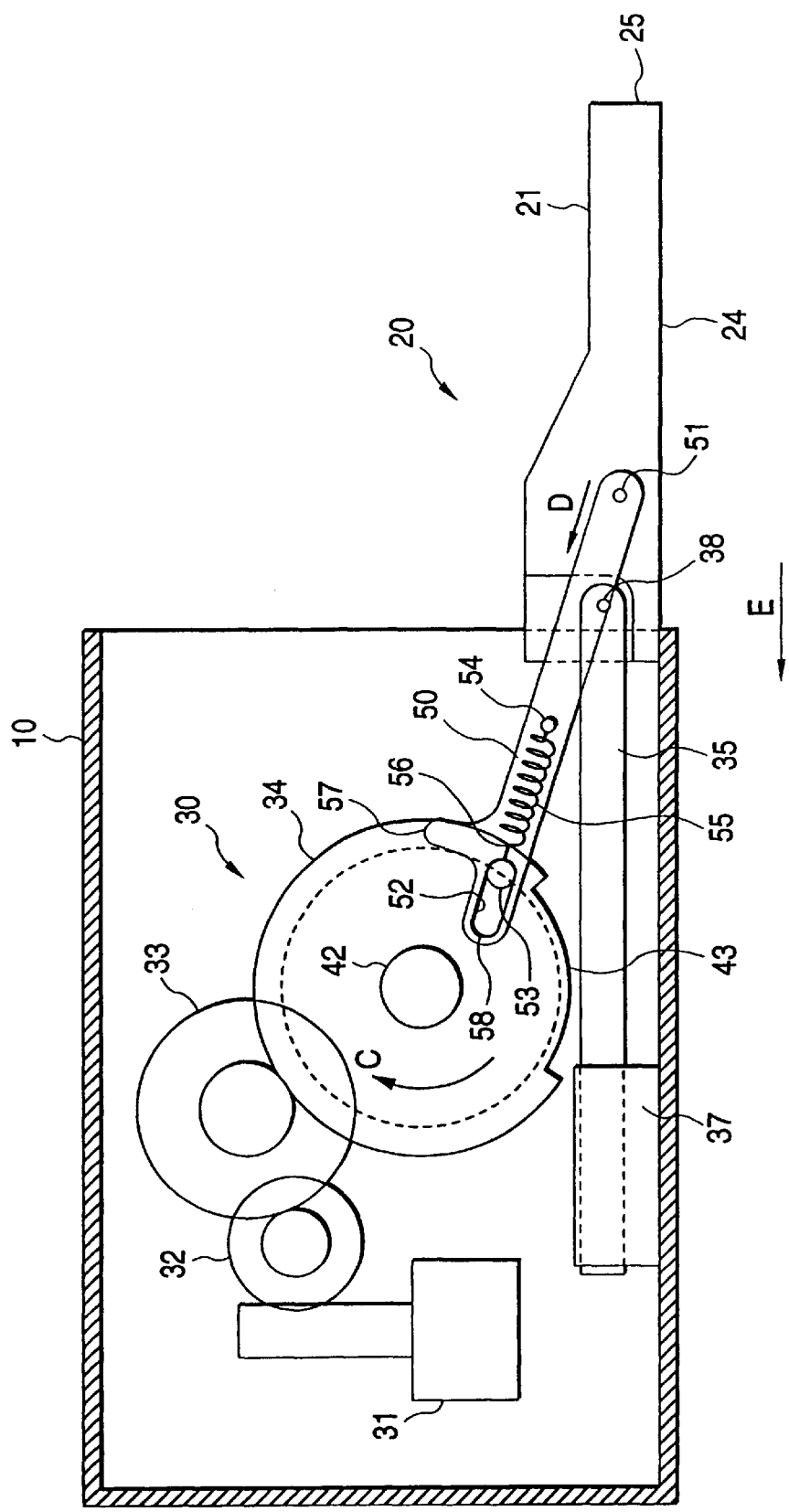
FIG. 7 is a view of the second embodiment of the car-mounted-type equipment of the present invention, showing a condition in which the opening-closing door is pivotally moved substantially 90 degrees.

On the other hand, when the gear 34 rotates, a rack 35 in mesh with the gear 34 is moved in a direction of arrow B to move the opening-closing door 20 to a pivotal movement position as described above for the first embodiment, and thereafter the opening-closing door 20 is opened as shown in FIG. 7.

Next, the operation for closing the opening-closing door 20 will be described.

FIG. 7 shows the opening-closing door 20 in its open condition, and in the open condition of the opening-closing door 20, the roller 53, rotatably mounted on the gear 34, is located at the opening-axis portion 56 of the pivotal-movement groove 52. In this condition, when the operator depresses an opening-closing button, a motor 31 is rotated in a reverse direction, and the gear 34 rotates in a clockwise direction (indicated by arrow C), and the roller 53 tends to slide along the pivotal-movement groove 52 in accordance with the rotation of the gear 34. However, since the retaining portion 54 of the lever 50 and the roller 53 are interconnected by the spring 55, the lever 50 is pulled up in a direction of arrow D under the influence of the spring 55, so that the opening-closing door 20 is pivotally moved about a slide pin 38.

Figure 8:
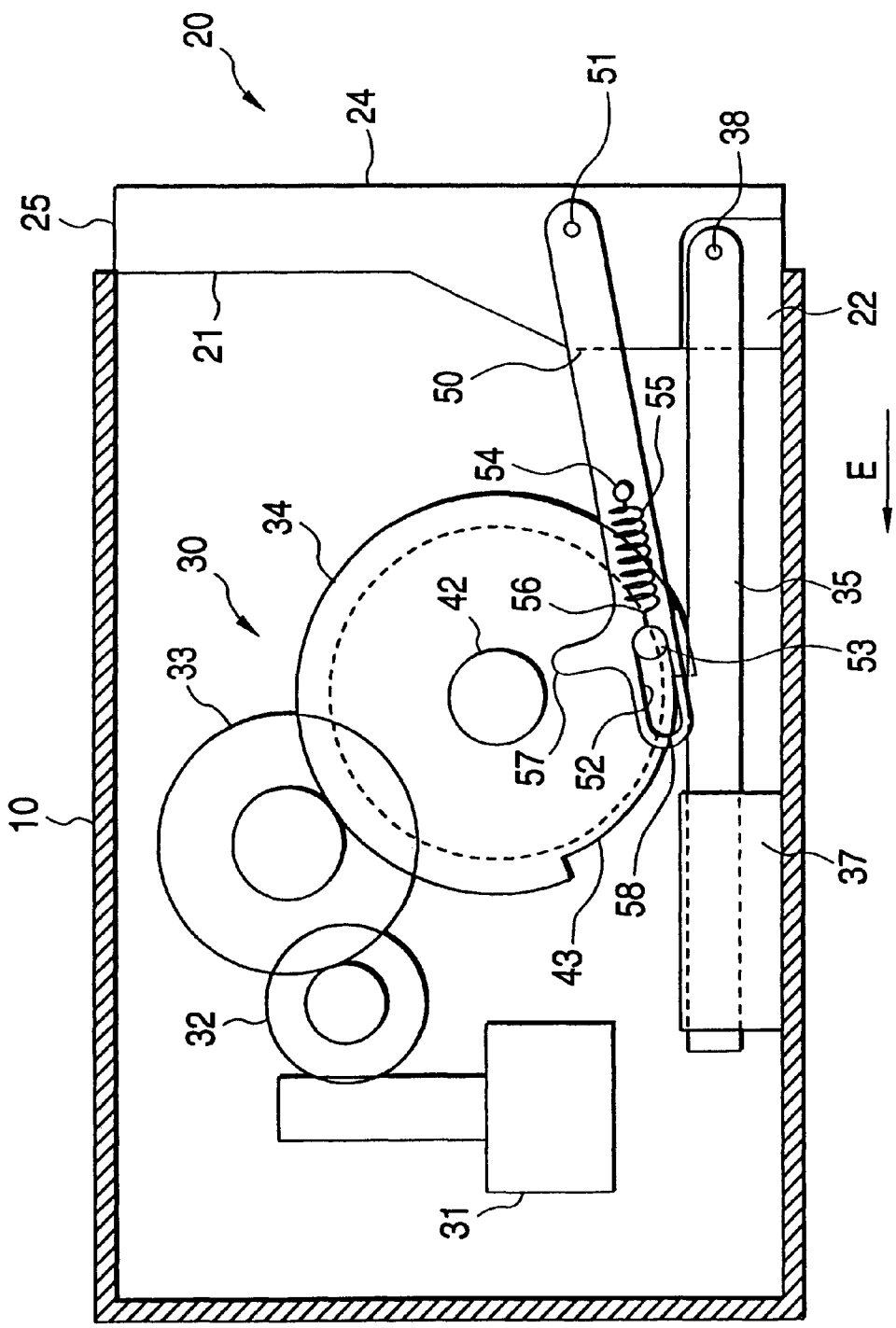
FIG. 8 is a view of the second embodiment of the car-mounted-type equipment of the present invention, showing a condition in which the opening-closing door is returned to a pivotal movement position.
Figure 9A:
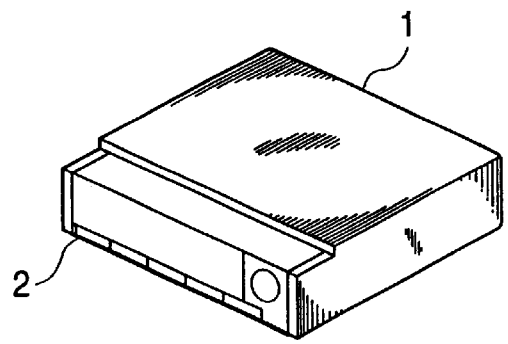
FIGS. 9A to 9D are views showing the manner of closing a body of a conventional car-mounted-type equipment with an opening-closing door.
Figure 9B:
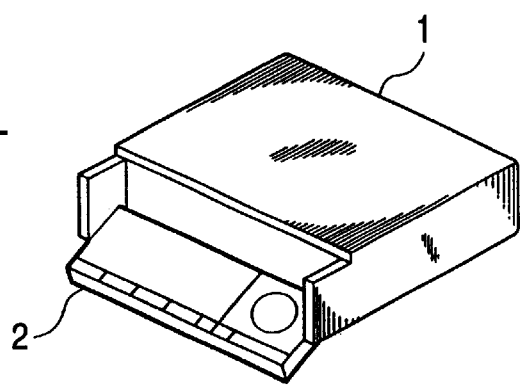
Figure 9C:
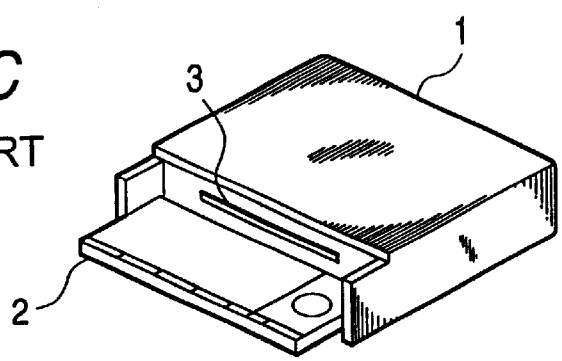
Figure 9D:
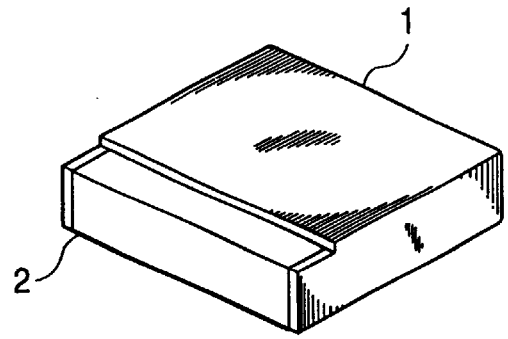

FIG. 8 shows the opening-closing door 20 returned to the pivotal movement position. The roller 53, rotatably mounted on the gear 34, is disposed at the opening-axis portion 56 of the pivotal movement groove 52 formed in the lever 50. When the gear 34 further rotates, the opening-closing door 20 is moved in a horizontal direction (indicated by arrow E) relative to the equipment body 10 in accordance with the movement of the rack 53.

The lever 50 moves in the direction of arrow E in accordance with the movement of the opening-closing door 20. However, the amount of movement of the rack 35 is different from the amount of movement of the roller 53, and therefore the roller 53 gradually moves toward the closing-axis portion 58 against the bias of the spring 55. Then, the projected portion 57 of the lever 50 is brought into engagement with the shaft 42 in accordance with the rotation of the gear 36, and thus the closing operation is finished.

As described above, in the embodiment of the car-mounted-type equipment of the present invention, when the opening-closing door 20 is to be opened, the slide pin 38, serving as the axis of pivotal movement, is driven or moved by the rack 35 (serving as the first drive mechanism) to the predetermined position in the direction perpendicular to the front side of the equipment body 10 prior to the pivotal movement of the opening-closing door 20. Thereafter, the roller 40 on the lever 36, serving as the second drive mechanism, presses the opening-axis portion 26 so as to pivotally move the opening-closing door 20 about the axis of pivotal movement (i.e., the opening-axis portion 26). Therefore, the opening-closing door can be opened and closed with the simple construction.

In the car-mounted-type equipment of the present invention, although the opening-closing button is provided at the bottom of the opening-closing door, this button may be provided at a predetermined portion of the equipment body, and alternatively a receiver portion of a remote control device may be provided at the equipment body. Namely, in so far as the opening-closing button can not be recognized when someone steals a glance at the inside of the car, any suitable method can be used.

In the car-mounted-type equipment of the present invention, the bottom of the opening-closing door has the same design as that of the dashboard within the car, and the bottom of the opening-closing door closes the equipment body, and the equipment body can be operated only when the opening-closing door is in its open condition. With this construction, even if someone steals a glance at the inside of the car, the existence of the car-mounted-type equipment can not be recognized, and the stealing of the car-mounted-type equipment can be prevented.

In this car-mounted-type equipment, when the opening-closing door is to be opened, the opening-closing door is first moved horizontally relative to the equipment by the first drive mechanism, and then the opening-closing door is pivotally moved by the second drive mechanism. Therefore, the opening-closing door can be pivotally moved with the simple construction.

What is claimed is:

1. A device body adapted to be mounted on a car, said device body comprising:
   a door mounted at a front side of said device body so as to cover a device housed in said device body when in a closed condition;
   an operating portion for operating the device housed in said device body, said operating portion being provided on such a surface that said operating portion is operable only when said door is in an open condition;
   a pivotal movement point, serving as an axis of pivotal movement of said door, and a drive point to which a drive force for pivotally moving said door is applied, said pivotal movement point and said drive point being provided on said door;
   a first drive mechanism for driving said pivotal movement point in a direction perpendicular to a front side of said door disposed in a closed condition; and
   a second drive mechanism for pivotally moving said door about said pivotal movement point;
   wherein when said door is to be opened, said axis of pivotal movement is driven in said perpendicular direction by said first drive mechanism before said door is pivotally moved.

2. The device body according to claim 1, wherein a slide pin comprises said pivotal movement point, said drive force is applied to a pivotal movement groove, said first drive mechanism is a rack and said second drive mechanism is a lever, and wherein when the door is to be opened, said slide pin is driven by said rack in a direction perpendicular to the front side of the door before said lever cooperates with said pivotal movement groove to pivot said door.

3. The device body according to claim 2, wherein said pivotal movement groove has an elliptical shape with an opening axis portion and a closing axis portion, wherein said lever has a roller mounted thereon, and wherein said roller reaches said opening axis portion to open said door and said roller reaches said closing axis portion to close said door.

4. The device body according to claim 1, wherein said device body is mounted on a car dashboard and when said door is in the closed condition, the device housed in said device body is camouflaged with the car dashboard.

5. The device body according to claim 3, further comprising a plurality of gears for driving said rack and said lever, and wherein during an opening operation of said door, a rotation of said gears is transmitted to said rack and said lever so that said rack slides toward said door thereby driving said slide pin while said roller moves from said closing axis portion to said opening axis portion, thereby causing said door to move perpendicularly from said device body before rotating away from said device body.

* * * * *